(12) United States Patent
Severin et al.

(10) Patent No.: US 8,545,172 B2
(45) Date of Patent: Oct. 1, 2013

(54) TURBOCHARGER HAVING NOZZLE RING LOCATING PIN AND AN INTEGRATED LOCATOR AND HEAT SHIELD

(75) Inventors: Emmanuel Severin, Morristown, NJ (US); Lorrain Sausse, Morristown, NJ (US); Pierre Barthelet, Morristown, NJ (US); Francis Abel, Morristown, NJ (US); Manuel Dufin, Morristown, NJ (US)

(73) Assignee: Honeywell International, Inc., Morristown, NJ (US)

( * ) Notice: Subject to any disclaimer, the term of this patent is extended or adjusted under 35 U.S.C. 154(b) by 1143 days.

(21) Appl. No.: 12/484,363

(22) Filed: Jun. 15, 2009

(65) Prior Publication Data

US 2010/0316490 A1 Dec. 16, 2010

(51) Int. Cl.
*F01D 17/12* (2006.01)
(52) U.S. Cl.
USPC ............................ 415/164; 415/165; 415/177
(58) Field of Classification Search
USPC ............ 415/163–165, 177–178, 213.1, 214.1
See application file for complete search history.

(56) References Cited

U.S. PATENT DOCUMENTS

| 6,962,481 B2 * | 11/2005 | Knauer et al. ............... 415/160 |
| 2007/0175216 A1 * | 8/2007 | Kobayashi .................. 60/605.2 |
| 2008/0075582 A1 * | 3/2008 | Sausse et al. ............... 415/159 |
| 2009/0060726 A1 * | 3/2009 | Severin et al. ............. 415/182.1 |

FOREIGN PATENT DOCUMENTS

DE 102004044703 A1 * 3/2006

* cited by examiner

*Primary Examiner* — Edward Look
*Assistant Examiner* — Jesse Prager
(74) *Attorney, Agent, or Firm* — Alston & Bird LLP

(57) ABSTRACT

A turbocharger with a variable nozzle includes a pin mounted in the center housing and extending axially therefrom and engaged in a hole in the nozzle ring to orient the nozzle ring rotationally relative to the center housing. A portion of a length of the pin has a substantially greater compliance than the remainder of the length such that the pin has a flexible tip that engages the hole in the nozzle ring. The flexible tip reduces constraint of thermal deformation of the nozzle ring. The pin portion of greater compliance can be a section of the tube that is slit and expanded. The turbocharger can also include a one-piece locator and heat shield having a locating portion abutting the center housing and the nozzle ring for radially locating the nozzle ring relative to the center housing, and having a shield portion shielding the center housing from hot exhaust gas.

13 Claims, 7 Drawing Sheets

TURBOCHARGER HAVING NOZZLE RING LOCATING PIN AND AN INTEGRATED LOCATOR AND HEAT SHIELD

BACKGROUND OF THE INVENTION

The present disclosure relates to turbochargers having a variable-nozzle turbine in which movable vanes are disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The variable vane mechanism is relatively complicated and thus presents a challenge in terms of assembly of the turbocharger. Furthermore, the mechanism is located between the turbine housing, which gets quite hot because of its exposure to exhaust gases, and the center housing, which is at a much lower temperature than the turbine housing. Accordingly, the variable vane mechanism is subject to thermal stresses because of this temperature gradient.

The assignee of the present application has previously addressed the issues noted above by providing a variable-nozzle turbocharger that includes a cartridge containing the variable vane mechanism. The turbine defines a nozzle through which exhaust gas is delivered to the turbine wheel, and a central bore through which exhaust gas is discharged after it passes through the turbine wheel. The cartridge is connected between the center housing and the turbine housing and comprises an assembly of a generally annular nozzle ring and an array of vanes circumferentially spaced about the nozzle ring and rotatably mounted to the nozzle ring and connected to a rotatable actuator ring such that rotation of the actuator ring rotates the vanes for regulating exhaust gas flow to the turbine wheel. The cartridge also includes an insert having a tubular portion sealingly received into the bore of the turbine housing and having a nozzle portion extending generally radially out from one end of the tubular portion, the nozzle portion being axially spaced from the nozzle ring such that the vanes extend between the nozzle ring and the nozzle portion. A plurality of spacers are connected between the nozzle portion of the insert and the nozzle ring for securing the nozzle ring to the insert and maintaining an axial spacing between the nozzle portion of the insert and the nozzle ring.

While the above-described turbocharger functions well, further improvements are sought.

BRIEF SUMMARY OF THE DISCLOSURE

In accordance with one aspect of the present disclosure, in a turbocharger generally of the type described above, the center housing has a nose portion adjacent the turbine wheel defining a generally radially outwardly facing first surface and a second surface that faces generally axially toward the turbine wheel, and the nozzle ring adjacent an inner diameter thereof defines a generally radially inwardly facing third surface joined with a fourth surface that faces generally axially toward the center housing. The turbocharger includes a pin fixedly mounted in the center housing and extending generally axially therefrom and engaged in a hole in the nozzle ring to orient the nozzle ring rotationally relative to the center housing. A portion of a length of the pin has a substantially greater compliance than the remainder of the length such that the pin has a flexible tip that engages the hole in the nozzle ring. The flexible tip reduces constraint of thermal deformation of the nozzle ring. The pin can comprise a sheet metal tube, the portion of substantially greater compliance comprising a section of the tube that is slit and expanded.

In some embodiments, the turbocharger can include a one-piece locator and heat shield having a locating portion abutting the first and second surfaces of the center housing and abutting the third surface of the nozzle ring for radially locating the nozzle ring relative to the center housing, and having a shield portion shielding the center housing from hot exhaust gas.

In one embodiment, the locator and heat shield comprises a piece of sheet metal formed into a non-planar configuration.

The locating portion in one embodiment comprises a spring that is radially deformable in resilient fashion to allow substantially unconstrained thermally induced radial deformation of the nozzle ring. The spring can be formed to have a generally C-shaped cross-section with an open side of the C facing generally axially. A radially outer leg of the C-shaped cross-section can abut the third and fourth surfaces of the nozzle ring. A radially inner leg of the C-shaped cross-section can abut the first surface of the center housing.

In one embodiment, the radially inner leg includes a plurality of circumferentially spaced tabs bent radially inwardly and configured to be resiliently deformed radially outwardly by the first surface of the center housing.

The shield portion of the locator and heat shield can extend generally radially inwardly from the radially inner leg of the spring. The nose portion of the center housing has a radially innermost region adjacent the shaft, and the shield portion is disposed to shield the radially innermost region from exhaust gas.

A turbocharger in accordance with one embodiment further comprises a generally ring-shaped flange having a first portion engaging a surface of the center housing that faces the nozzle ring and extending in a generally axial direction radially outward of an outer diameter of the nozzle ring, and having a second portion extending generally radially inwardly from the first portion and engaging a side of the nozzle ring facing away from the center housing so as to restrain the nozzle ring against movement axially away from the center housing.

A turbocharger in accordance with one embodiment further comprises a generally ring-shaped spring member disposed between and abutting the surface of the center housing facing the nozzle ring and an opposing surface of the nozzle ring, the spring member urging the nozzle ring axially toward and against the second portion of the flange.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
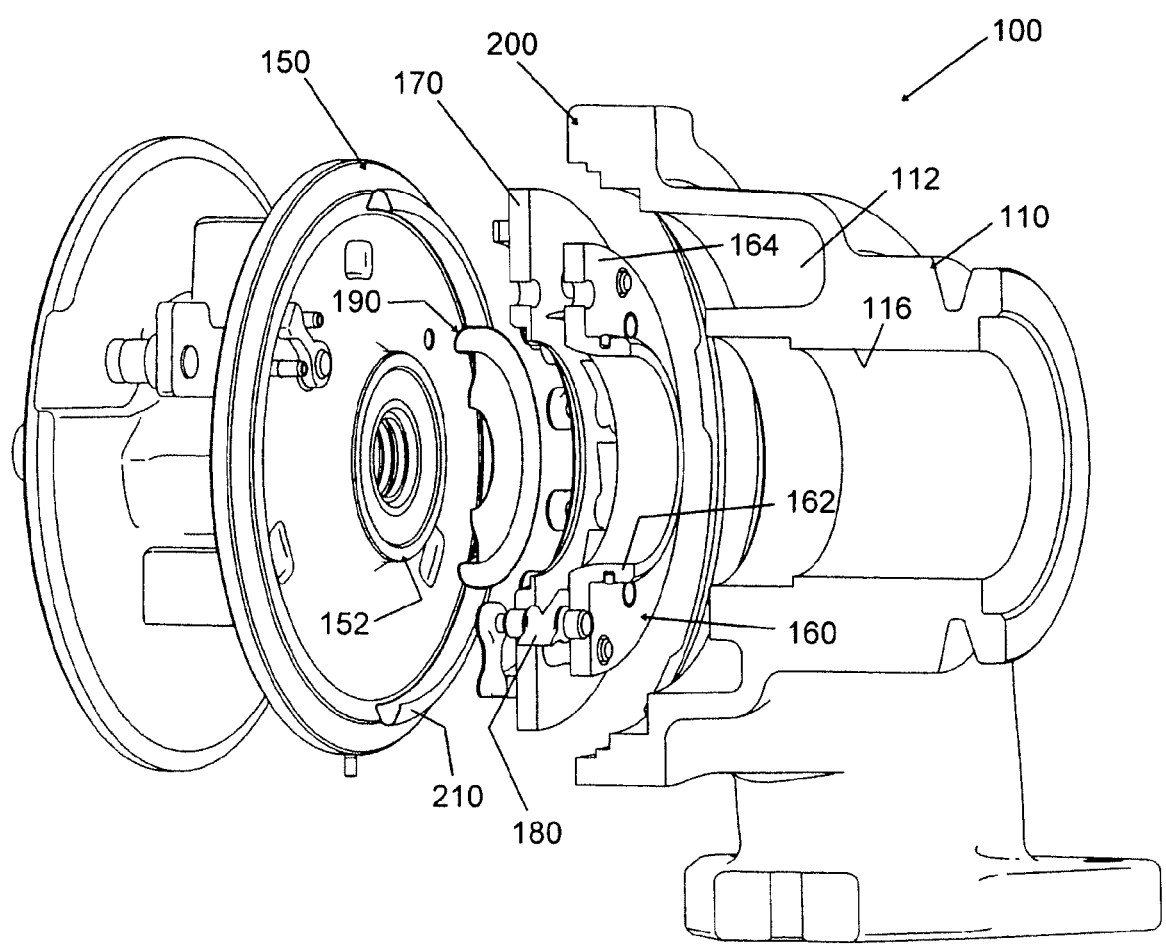
FIG. 1 is an exploded view, partly in section, of a turbocharger in accordance with one embodiment of the invention.
Figure 2:
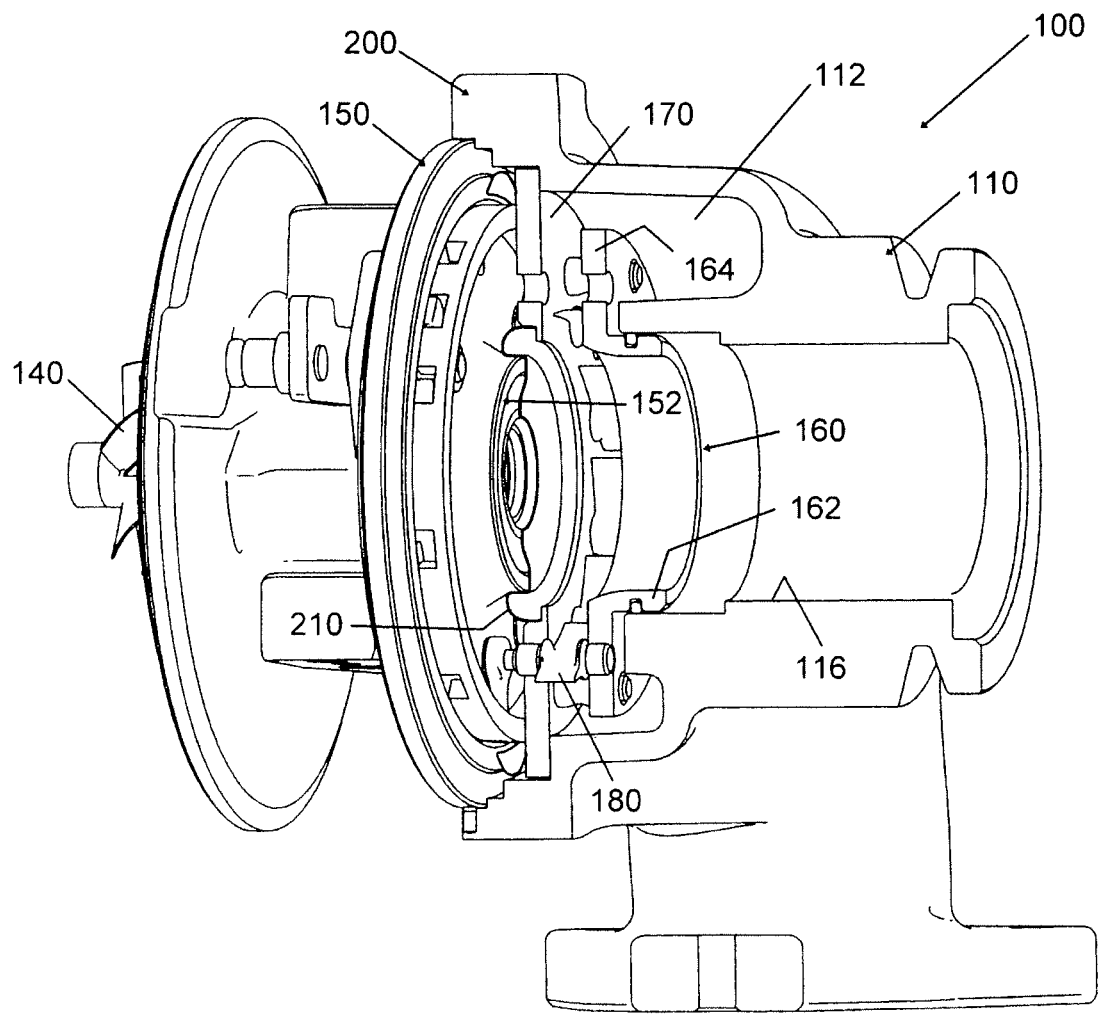
FIG. 2 is a partially exploded view, partly in section, of the turbocharger of FIG. 1.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A turbocharger 100 in accordance with one embodiment of the invention is shown in FIGS. 1 through 5. The turbocharger includes a turbine comprising a turbine housing 110 and a turbine wheel 120 (FIG. 3) mounted in the turbine housing and connected to a rotatable shaft 130 for rotation therewith. The turbine housing defines a chamber 112 surrounding the turbine wheel for receiving exhaust gas, and there is a nozzle 114 leading from the chamber generally radially inwardly to the turbine wheel. The turbine housing also defines an axially extending bore 116 through which exhaust gas is discharged after passing through the turbine wheel.

The turbocharger further comprises a compressor comprising a compressor housing (not shown) and a compressor wheel 140 mounted in the compressor housing and connected to the rotatable shaft 130 for rotation therewith. A center housing 150 is connected between the compressor housing and the turbine housing 110 and has a nose portion 152 (FIG. 5) adjacent the turbine wheel. The nose portion defines a generally radially outwardly facing first surface 154 and a second surface 156 that faces generally axially toward the turbine wheel. The shaft 130 passes through the center housing, which supports bearings 132 for the shaft.

The turbocharger further comprises a variable-nozzle assembly that includes an insert 160 having a tubular portion 162 sealingly received into the bore 116 of the turbine housing and having a generally annular nozzle portion 164 extending generally radially out from one end of the tubular portion. The variable-nozzle assembly also includes a generally annular nozzle ring 170 axially spaced from the nozzle portion 164, and an array of vanes 180 circumferentially spaced about the nozzle ring and rotatably mounted to the nozzle ring such that the vanes are variable in setting angle for regulating exhaust gas flow to the turbine wheel. The nozzle ring 170 adjacent its inner diameter defines a generally radially inwardly facing third surface 172 joined with a fourth surface 174 that faces generally axially toward the center housing.

Figure 5:
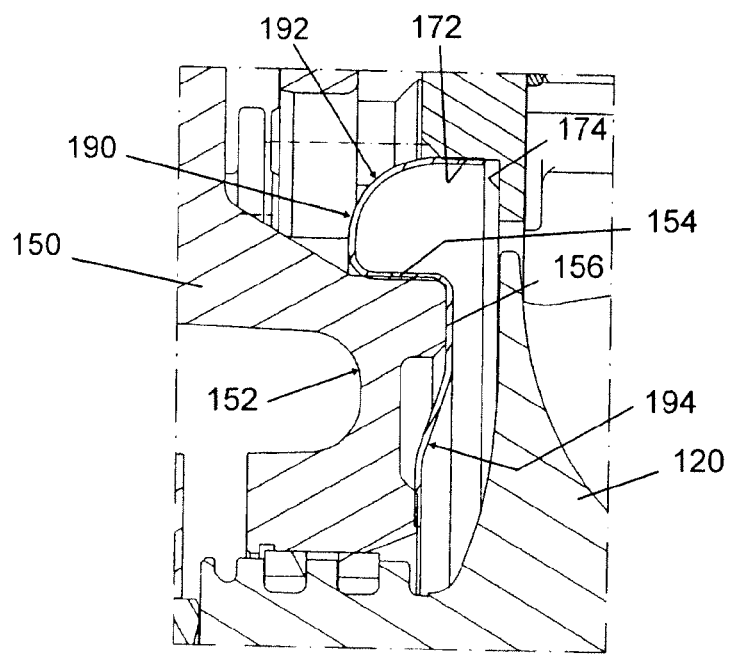
FIG. 5 is a magnified portion of the cross-sectional view of FIG. 3.

With particular reference to FIG. 5, the turbocharger includes a one-piece locator and heat shield 190 having a locating portion 192 abutting the first and second surfaces 154, 156 of the center housing 150 and also abutting the third surface 172 (and, optionally, the fourth surface 174) of the nozzle ring 170 for radially locating (and, optionally, axially locating) the nozzle ring relative to the center housing. The locator and heat shield also includes a shield portion 194 shielding the center housing from hot exhaust gas.

The locator and heat shield 190 can be formed from a sheet of steel that is permanently deformed into a non-planar configuration as shown. The locating portion 192 in one embodiment comprises a spring that is radially deformable in resilient fashion to allow substantially unconstrained thermally induced radial deformation of the nozzle ring 170. The spring can be formed to have a generally C-shaped cross-section as shown, with an open side of the C facing generally axially. A radially outer leg of the C-shaped cross-section abuts the third surface 172 of the nozzle ring. A radially inner leg of the C-shaped cross-section abuts the first surface 154 of the center housing. In one embodiment, the radially inner leg can include a plurality of circumferentially spaced tabs (not shown) bent radially inwardly and configured to be resiliently deformed radially outwardly by the first surface 154 of the center housing.

The shield portion 194 of the locator and heat shield extends generally radially inwardly from the radially inner leg of the spring. The nose portion 152 of the center housing has a radially innermost region adjacent the shaft, and the shield portion is disposed to shield the radially innermost region from exhaust gas.

Figure 3:
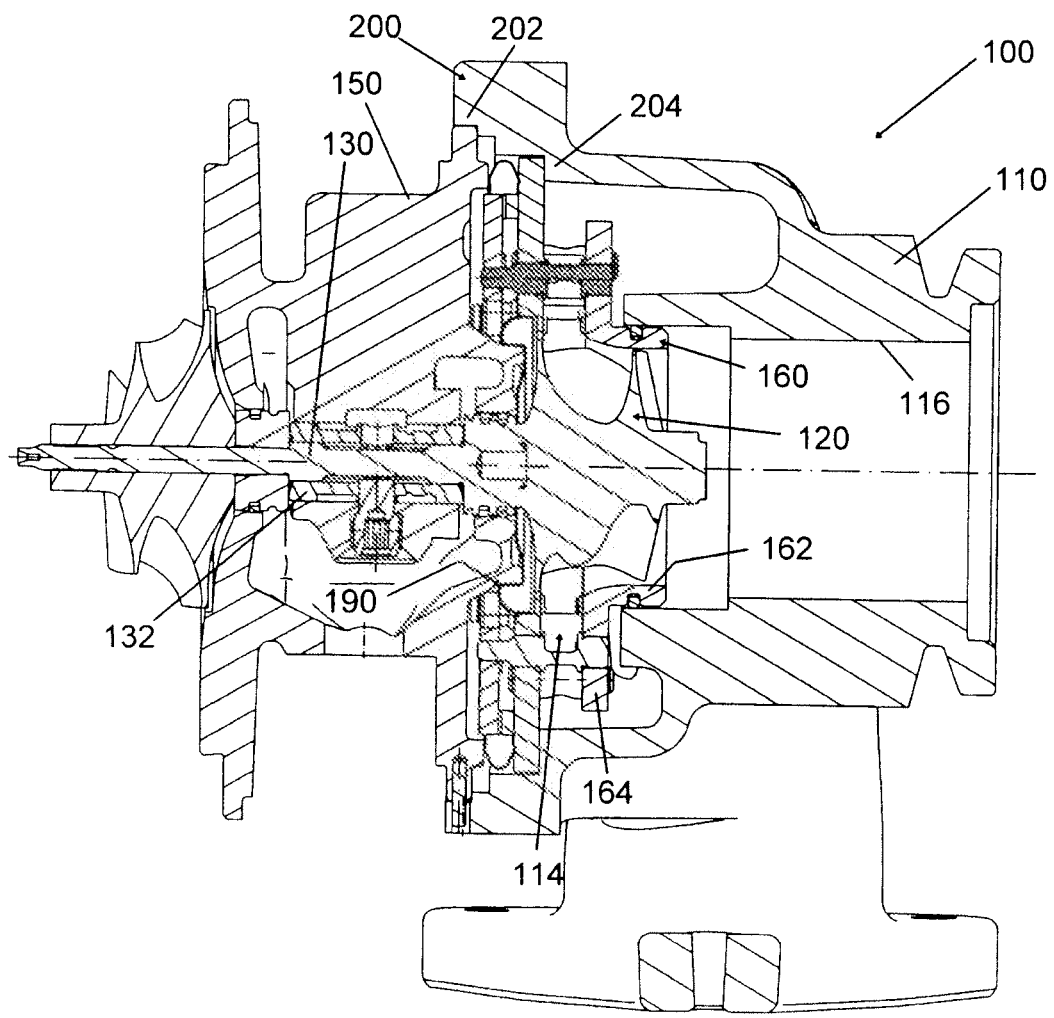
FIG. 3 is an axial cross-sectional view of the turbocharger of FIG. 1.
Figure 4:
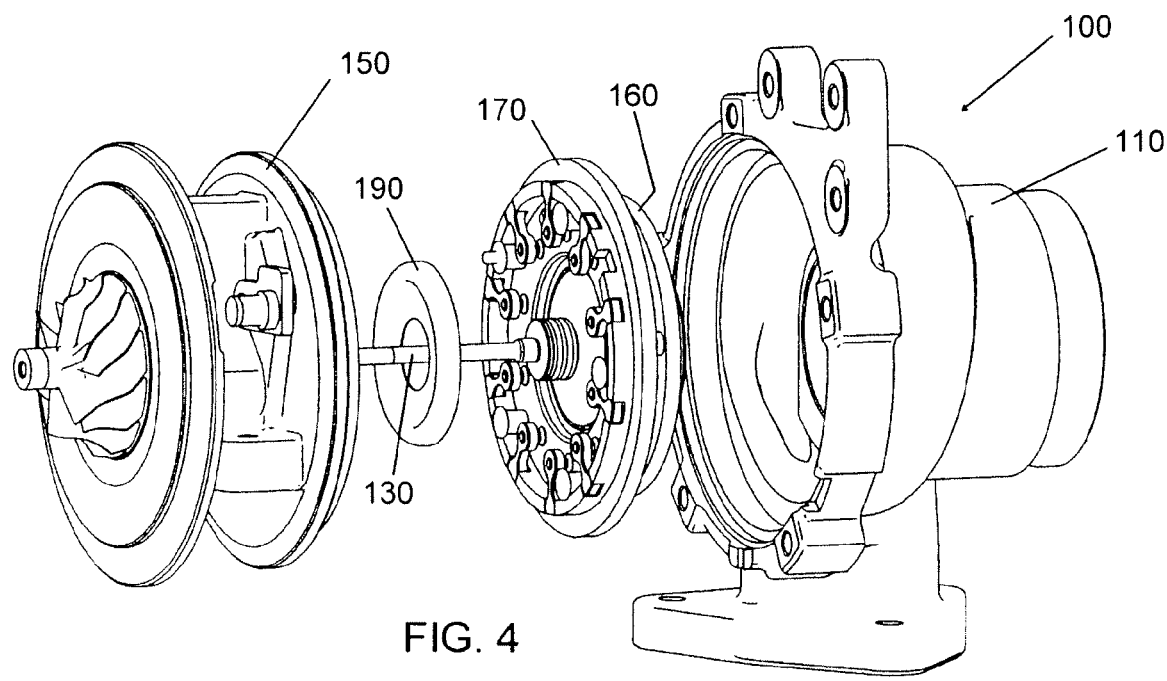
FIG. 4 is a further exploded view of the turbocharger of FIG. 1.

As best seen in FIG. 3, the turbocharger 100 also includes a generally ring-shaped flange 200 defined by the turbine housing. The flange has a first portion 202 that engages a surface of the center housing 150 facing the nozzle ring and extends in a generally axial direction radially outward of an outer diameter of the nozzle ring 170. The flange has a second portion 204 extending generally radially inwardly from the first portion and engaging a side of the nozzle ring facing away from the center housing so as to restrain the nozzle ring against movement axially away from the center housing. A generally ring-shaped spring member 210 is disposed between and abuts a surface of the center housing facing the nozzle ring and an opposing surface of the nozzle ring, the spring member urging the nozzle ring axially toward and against the second portion of the flange 200. In this manner, the nozzle ring is axially located with respect to the turbine housing. In the illustrated embodiment, the spring member 210 has a generally U-shaped cross-section wherein an open side of the U faces radially inwardly. However, other configurations of spring member can be used.

A further aspect of the invention is now explained with reference to FIGS. 6 through 8, which illustrate a turbocharger 100' in accordance with another embodiment of the invention. The turbocharger 100' in most respects is similar to the previously described turbocharger 100, and the common aspects are not repeated here. The chief difference between the two embodiments is the provision in the turbocharger 100' of a means for rotationally orienting the nozzle ring relative to the center housing. More particularly, the turbocharger includes a pin 220 having one end fixedly mounted in a hole 158 in the center housing. The hole 158 extends generally parallel to the central longitudinal axis of the turbocharger. The opposite end of the pin 220 has a flexible tip portion 222 that is engaged in a hole 176 in the nozzle ring 170' to orient the nozzle ring rotationally relative to the center housing 150'. The flexible tip 220 comprises a portion of a length of the pin 220 having a substantially greater compliance than the remainder of the length. The flexible tip reduces the degree of constraint of thermal deformation of the nozzle ring caused by the pin's engagement in the nozzle ring hole 176.

In one embodiment, the pin 220 comprises a sheet metal tube, and the flexible tip 222 comprises a section of the tube that is slit and radially expanded. More particularly, a plurality of axial slits spaced about the circumference of the tube are formed through the tube wall proximate to but spaced a short distance from one end of the tube, thereby creating a plurality of long narrow strips of the tube wall. The end of the tube is then axially compressed toward the opposite end of the tube to cause the strips to expand radially outwardly. In comparison to the rest of the tube's length, the expanded section of the tube has substantially greater compliance in directions radially inwardly relative to the tube's axis. This ensures that the nozzle ring 170' is not unduly constrained by the pin 220 when the nozzle ring undergoes thermal deformations.

Figure 6:
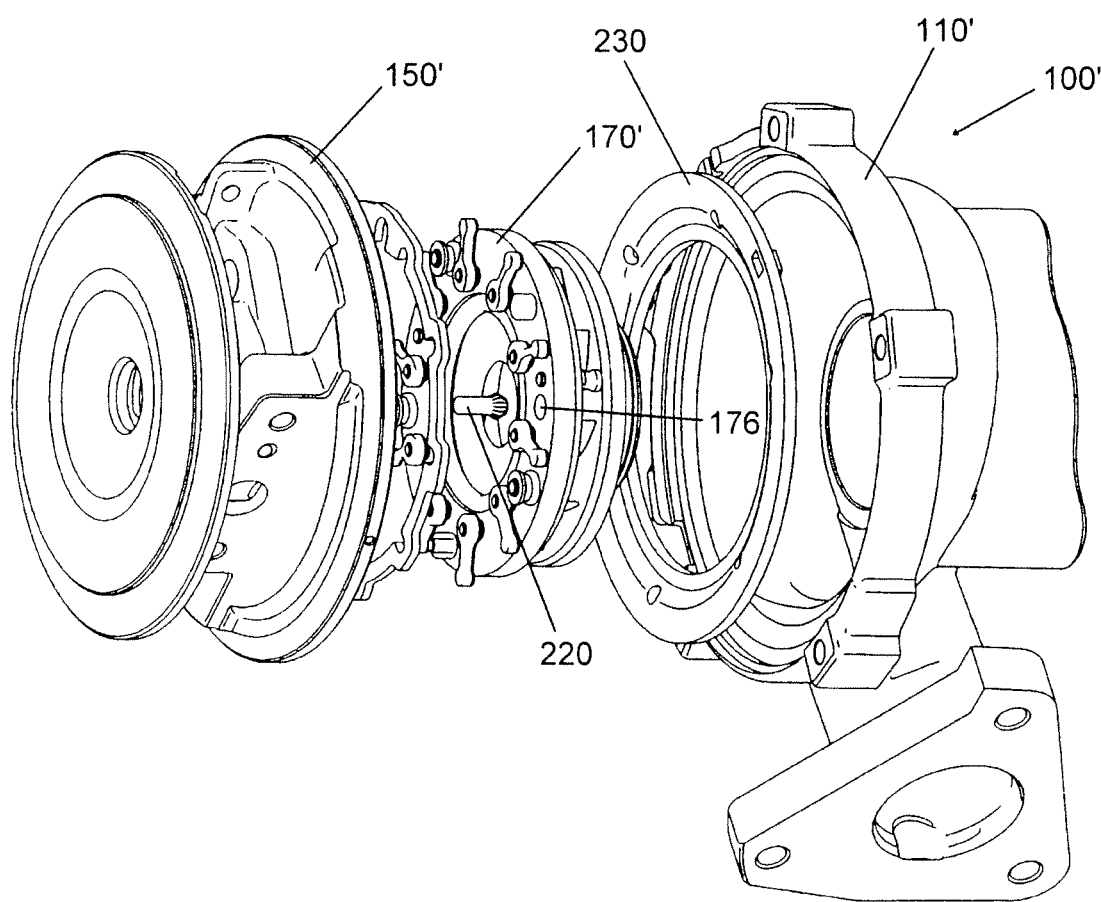
FIG. 6 is an exploded view of a turbocharger in accordance with another embodiment of the invention.
Figure 7:
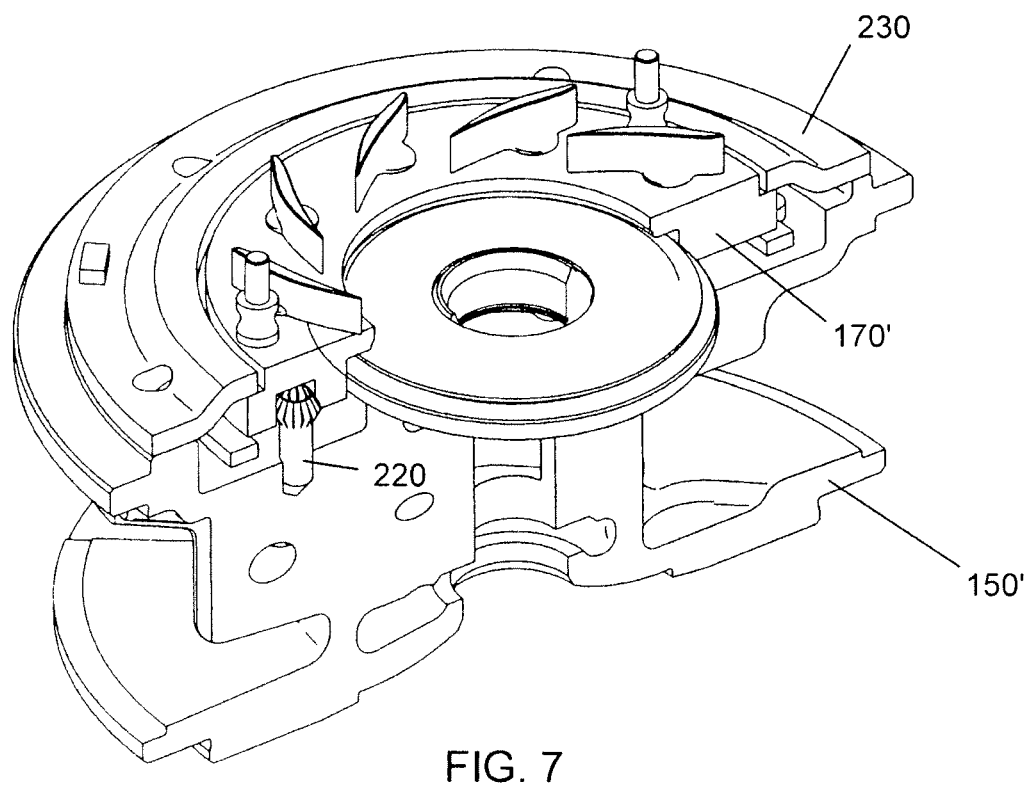
FIG. 7 is perspective view, in section, of a nozzle assembly portion of the turbocharger of FIG. 6.
Figure 8:
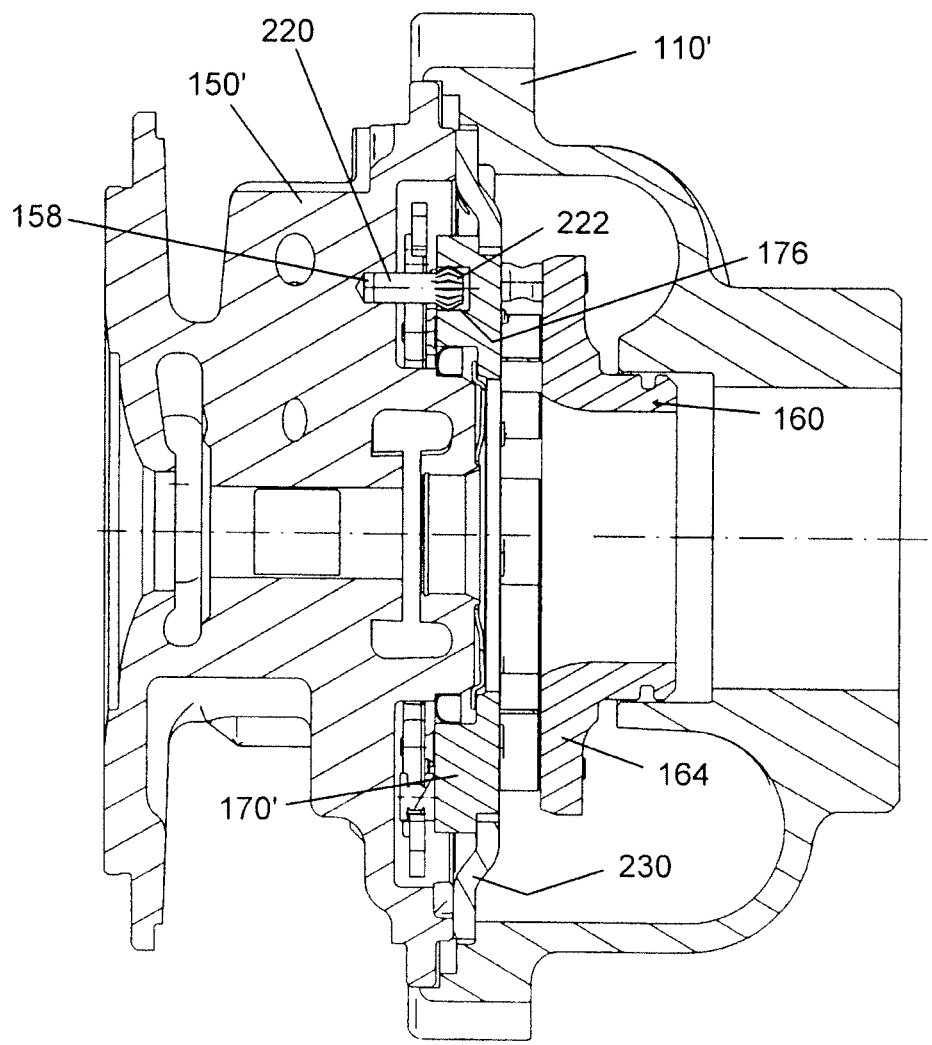
FIG. 8 is a cross-sectional view of the turbocharger of FIG. 6.

In the embodiment of FIGS. 6-8, the nozzle ring 170' does not directly abut the turbine housing as in the prior embodiment. Instead, the turbocharger 100' includes a flange 230 that is ring-shaped and has a radially outer portion captured between an outer portion of the turbine housing 110' and an outer portion of the center housing 150'. A radially inner portion of the flange 230 engages an axially facing surface of the nozzle ring 170' that faces generally toward the nozzle portion 164 of the insert 160, and in this manner the flange 230 axially locates the nozzle ring 170' relative to the turbine housing 110'.

The flexible pin 220 can be used in a turbocharger not having the integral locator and heat shield 190 as shown in FIGS. 6-8, or it can be combined with the features of the turbocharger 100 having the integral locator and heat shield.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle turbine, comprising:
    a turbine comprising a turbine housing and a turbine wheel mounted in the turbine housing and connected to a rotatable shaft for rotation therewith, the turbine housing defining a chamber surrounding the turbine wheel for receiving exhaust gas, and an axially extending bore through which exhaust gas is discharged after passing through the turbine wheel;
    a nozzle leading from the chamber generally radially inwardly to the turbine wheel;
    a compressor comprising a compressor housing and a compressor wheel mounted in the compressor housing and connected to the rotatable shaft for rotation therewith;
    a center housing connected between the compressor housing and the turbine housing and having a nose portion adjacent the turbine wheel defining a generally radially outwardly facing first surface and a second surface that faces generally axially toward the turbine wheel;
    a generally annular nozzle ring having a first face comprising one wall of the nozzle and axially spaced from an opposite wall of the nozzle, and an array of vanes circumferentially spaced about the nozzle ring and disposed in the nozzle, the vanes being rotatably mounted to the nozzle ring such that the vanes are variable in setting angle for regulating exhaust gas flow to the turbine wheel, the nozzle ring adjacent an inner diameter thereof defining a generally radially inwardly facing third surface joined with a fourth surface that faces generally axially toward the center housing, the nozzle ring defining a blind hole in a second face of the nozzle ring opposite from the first face; and
    a pin fixedly mounted in the center housing and extending generally axially therefrom and engaged in the blind hole in the nozzle ring to orient the nozzle ring rotationally relative to the center housing, a portion of a length of the pin having a substantially greater compliance than the remainder of the length such that the pin has a flexible tip that engages the blind hole in the nozzle ring, the flexible tip reducing constraint of thermal deformation of the nozzle ring.

2. The turbocharger of claim 1, wherein the pin comprises a sheet metal tube, the portion of substantially greater compliance comprising a section of the tube that is slit and radially expanded.

3. The turbocharger of claim 1, further comprising a one-piece locator and heat shield having a locating portion abutting the first and second surfaces of the center housing and abutting the third surface of the nozzle ring for radially locating the nozzle ring relative to the center housing, and a shield portion shielding the center housing from hot exhaust gas.

4. The turbocharger of claim 3, wherein the locator and heat shield comprises a piece of sheet metal formed into a non-planar configuration.

5. The turbocharger of claim 4, wherein the locating portion comprises a spring that is radially deformable in resilient fashion to allow substantially unconstrained thermally induced radial deformation of the nozzle ring.

6. The turbocharger of claim 5, wherein the spring is formed to have a generally C-shaped cross-section with an open side of the C facing generally axially.

7. The turbocharger of claim 6, wherein a radially outer leg of the C-shaped cross-section abuts the third and fourth surfaces of the nozzle ring.

8. The turbocharger of claim 7, wherein a radially inner leg of the C-shaped cross-section abuts the first surface of the center housing.

9. The turbocharger of claim 8, wherein the radially inner leg includes a plurality of circumferentially spaced tabs bent radially inwardly and configured to be resiliently deformed radially outwardly by the first surface of the center housing.

10. The turbocharger of claim 8, wherein the shield portion extends generally radially inwardly from the radially inner leg.

11. The turbocharger of claim 10, wherein the nose portion of the center housing has a radially innermost region adjacent the shaft, and the shield portion is disposed to shield the radially innermost region from exhaust gas.

12. The turbocharger of claim 1, further comprising a generally ring-shaped flange having a first portion engaging a surface of the center housing that faces the nozzle ring and extending in a generally axial direction radially outward of an outer diameter of the nozzle ring, and having a second portion extending generally radially inwardly from the first portion and engaging a side of the nozzle ring facing away from the center housing so as to restrain the nozzle ring against movement axially away from the center housing.

13. The turbocharger of claim 12, further comprising a generally ring-shaped spring member disposed between and abutting the surface of the center housing facing the nozzle ring and an opposing surface of the nozzle ring, the spring member urging the nozzle ring axially toward and against the second portion of the flange.

\* \* \* \* \*